(12) United States Patent
Horiuchi et al.

(10) Patent No.: US 6,905,131 B2
(45) Date of Patent: Jun. 14, 2005

(54) BICYCLE SUSPENSION ASSEMBLY

(75) Inventors: Noriyuki Horiuchi, Higashioosaka (JP); Hiroyuki Miyoshi, Sakai (JP)

(73) Assignee: Shimano Inc., Osaka (JP)

( * ) Notice: Subject to any disclaimer, the term of this patent is extended or adjusted under 35 U.S.C. 154(b) by 24 days.

(21) Appl. No.: 10/638,470

(22) Filed: Aug. 12, 2003

(65) Prior Publication Data

US 2005/0035572 A1 Feb. 17, 2005

(51) Int. Cl.7 .............................................. B62K 1/00
(52) U.S. Cl. .................................. 280/276; 280/288.4
(58) Field of Search ........................ 280/279, 276, 280/277, 283, 782, 288.4; 188/299.1, 266.2

(56) References Cited

U.S. PATENT DOCUMENTS

| | | | | |
|---|---|---|---|---|
| 2,511,489 A | * | 6/1950 | Woermbke | 310/75 R |
| 4,559,462 A | * | 12/1985 | Hernandez-Badillo | 310/67 A |
| 4,961,483 A | * | 10/1990 | Yamaoka et al. | 188/266.7 |
| 6,026,939 A | * | 2/2000 | Girvin et al. | 188/266.7 |
| 6,409,197 B1 | | 6/2002 | Endo et al. | |
| 6,505,719 B2 | * | 1/2003 | Gonzalez et al. | 188/319.2 |
| 6,559,564 B1 | | 5/2003 | Itou | |
| 6,600,411 B2 | * | 7/2003 | Nishimoto | 340/432 |
| 2001/0030408 A1 | | 10/2001 | Miyoshi | |

* cited by examiner

*Primary Examiner*—Daniel G. DePumpo
(74) *Attorney, Agent, or Firm*—Shinjyu Global IP Counselors, LLP

(57) ABSTRACT

A bicycle suspension assembly is configured with a pair of telescoping struts with one of the struts having an electrical cord located in an interior area of located between upper and lower telescoping members of the strut. The electrical cord located in the interior area with sufficient slack to accommodate expansion and contraction of the telescoping struts. Preferably, only one of the struts includes a dampening unit, while the other strut includes the electrical cord located in an interior area.

28 Claims, 17 Drawing Sheets

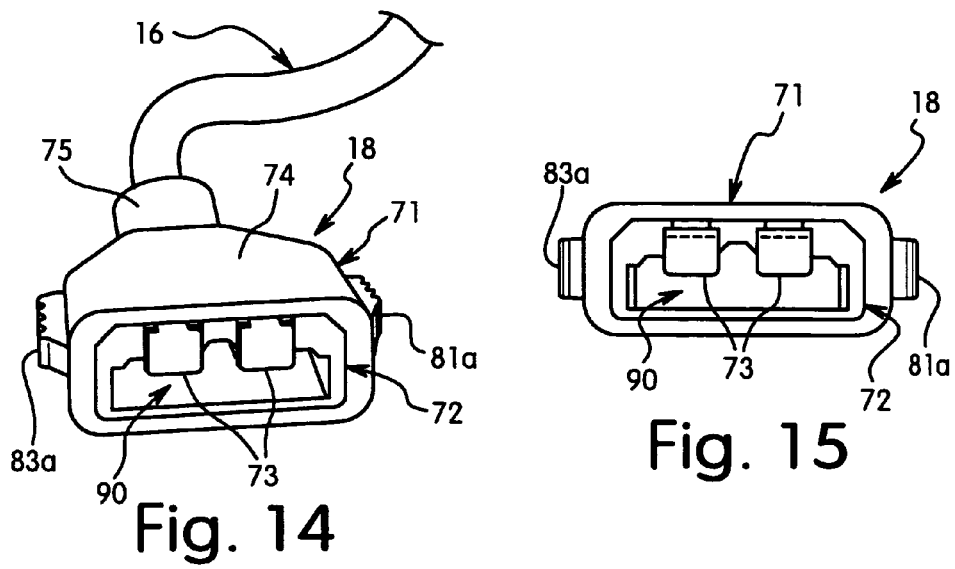
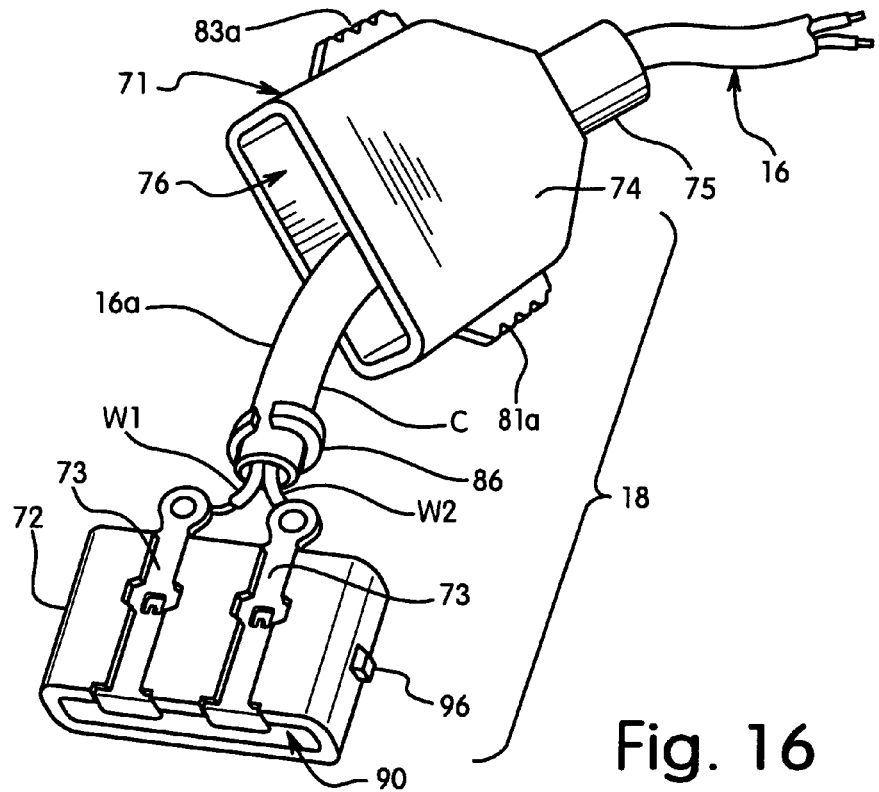

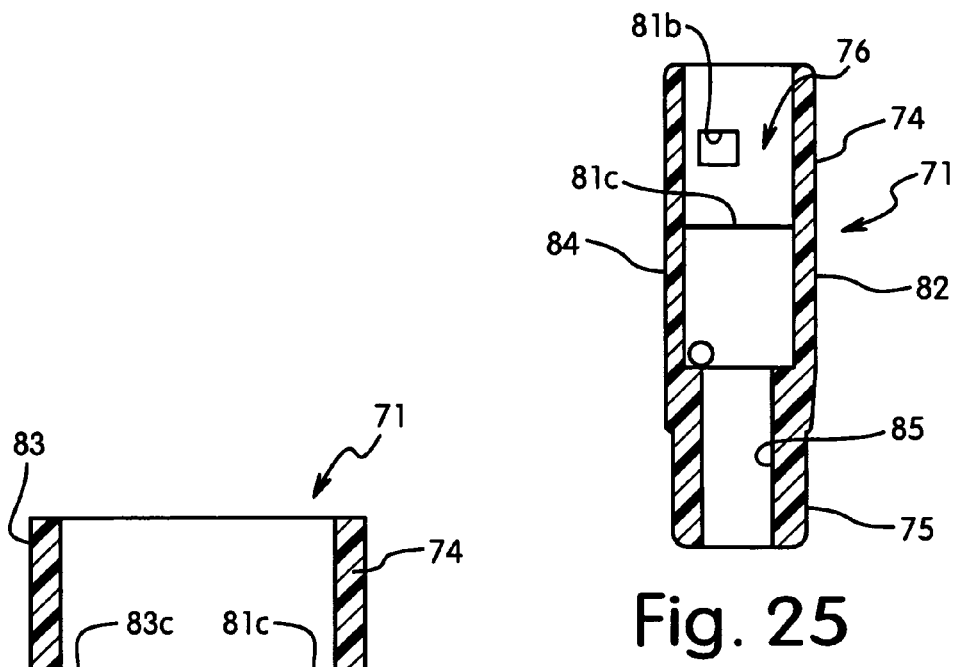
Fig. 25
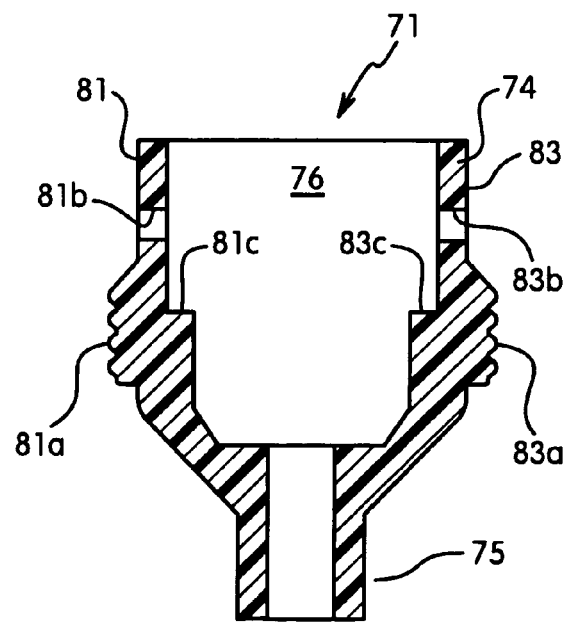
Fig. 26
Fig. 27

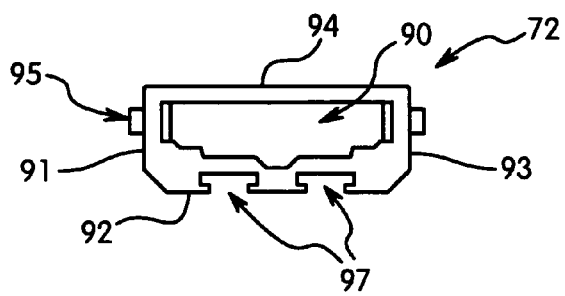
Fig. 28
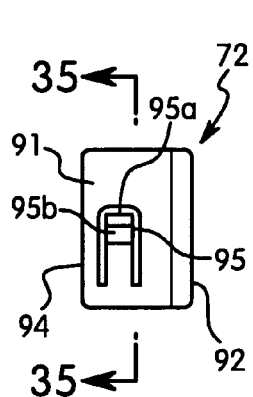 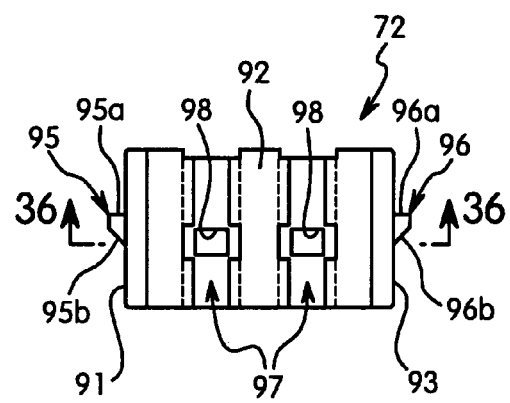 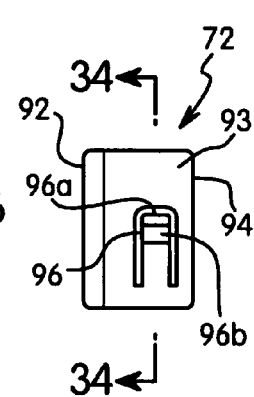
Fig. 29  Fig. 30  Fig. 31
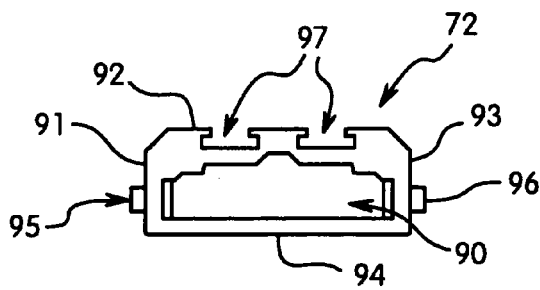
Fig. 32 ced a preferred embodiment of the present invention.

BICYCLE SUSPENSION ASSEMBLY

BACKGROUND OF THE INVENTION

1. Field of the Invention

This invention generally relates to a bicycle having a suspension and a bicycle dynamo hub. More specifically, the present invention relates to an electrical cord that has an electrical cord connector which is utilized with a front bicycle suspension having a hub dynamo that is removably coupled to the front bicycle suspension.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, bicycles have been equipped with more and more electrical components requiring electrical power. Thus, some bicycles have been equipped with a hub dynamo for generating and supplying electrical power to the various electrical components such as lamps, cycle computers, electronic shifting units, etc. Two examples of hub dynamos are disclosed in U.S. Pat. Nos. 6,409,197 and 6,559,564, which are assigned to Shimano, Inc.

The dynamo hub typically has an electrical cord that supplies the power to the various components mounted on the bicycle that require electrical power. This electrical cord must be attached to the bicycle frame in a manner such that it does not interfere with the normal operation of the bicycle and its components. For example, when the dynamo hub is part of a front hub, the electrical cord must be mounted in a manner such that it does not interfere with the turning of the front fork and front bicycle wheel relative to the main frame. Moreover, if a dynamo hub were to be mounted on a bicycle having a front suspension fork, then the electrical cord must be mounted in a manner to provide for the contraction and expansion of the front suspension fork.

Also, when a dynamo hub is integrated with a hub that has a quick release axle, the connection between the electrical cord and the dynamo hub sometimes gets damaged due to the fragile connection therebetween. In other words, when the wheel with the dynamo hub is detach from the main frame, it is usually necessary to detach the electrical cord from the dynamo hub to remove the wheel. This often results in the connection between the electrical cord and the dynamo hub being damaged over a period of time in which the connection is repeatedly connected and disconnected.

In view of the above, it will be apparent to those skilled in the art from this disclosure that there exists a need for an improved bicycle suspension assembly. This invention addresses this need in the art as well as other needs, which will become apparent to those skilled in the art from this disclosure.

SUMMARY OF THE INVENTION

One object of the present invention is to provide a bicycle suspension assembly that has an electrical cord configured and arranged to avoid interfering with the normal operation of the bicycle suspension.

Another object of the present invention is to provide a bicycle suspension assembly that is relatively inexpensive to manufacture.

The foregoing objects can basically be attained by providing a bicycle suspension assembly that basically includes a first inner telescoping member, a second inner telescoping member, a first outer telescoping member, a second outer telescoping member and an electrical cord. The first inner telescoping member includes a first upper end portion and a first lower end portion with a first upper internal passage located between the first upper and lower end portions. The second inner telescoping member includes a second upper end portion and a second lower end portion. The first outer telescoping member is slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion. The second outer telescoping member is slideably coupled to the second lower end portion of the second inner telescoping member between an extended position and a retracted position. The electrical cord is located in the first upper internal passage and the first lower internal passage.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 14 is a partial perspective view of the lower or bottom end of the electrical cord with the electrical cord connector in accordance with the present invention;

FIG. 15 is an end elevational view of the electrical cord connector of the electrical cord in accordance with the present invention;

FIG. 16 is a partial exploded perspective view of the electrical cord connector with the outer housing part disconnected from the inner housing part in accordance with the present invention;

FIG. 25 is a first cross-sectional view of the outer housing part of the electrical cord connector as seen along section line 25—25 of FIG. 22 in accordance with the present invention;

FIG. 26 is a second cross-sectional view of the outer housing part of the electrical cord connector as seen along section line 26—26 of FIG. 21 in accordance with the present invention;

FIG. 27 is a third cross-sectional view of the outer housing part of the electrical cord connector as seen along section line 27—27 of FIG. 21 in accordance with the present invention;

FIG. 28 is a top plan view of the inner housing part of the electrical cord connector in accordance with the present invention;

FIG. 29 is a first edge elevational view of the inner housing part of the electrical cord connector in accordance with the present invention;

FIG. 30 is a first side elevational view of the inner housing part of the electrical cord connector in accordance with the present invention;

FIG. 31 is a second edge elevational view of the inner housing part of the electrical cord connector in accordance with the present invention;

FIG. 32 is a bottom plan view of the inner housing part of the electrical cord connector in accordance with the present invention;

DETAILED DESCRIPTION OF THE PREFERRED EMBODIMENTS

Figure 1:
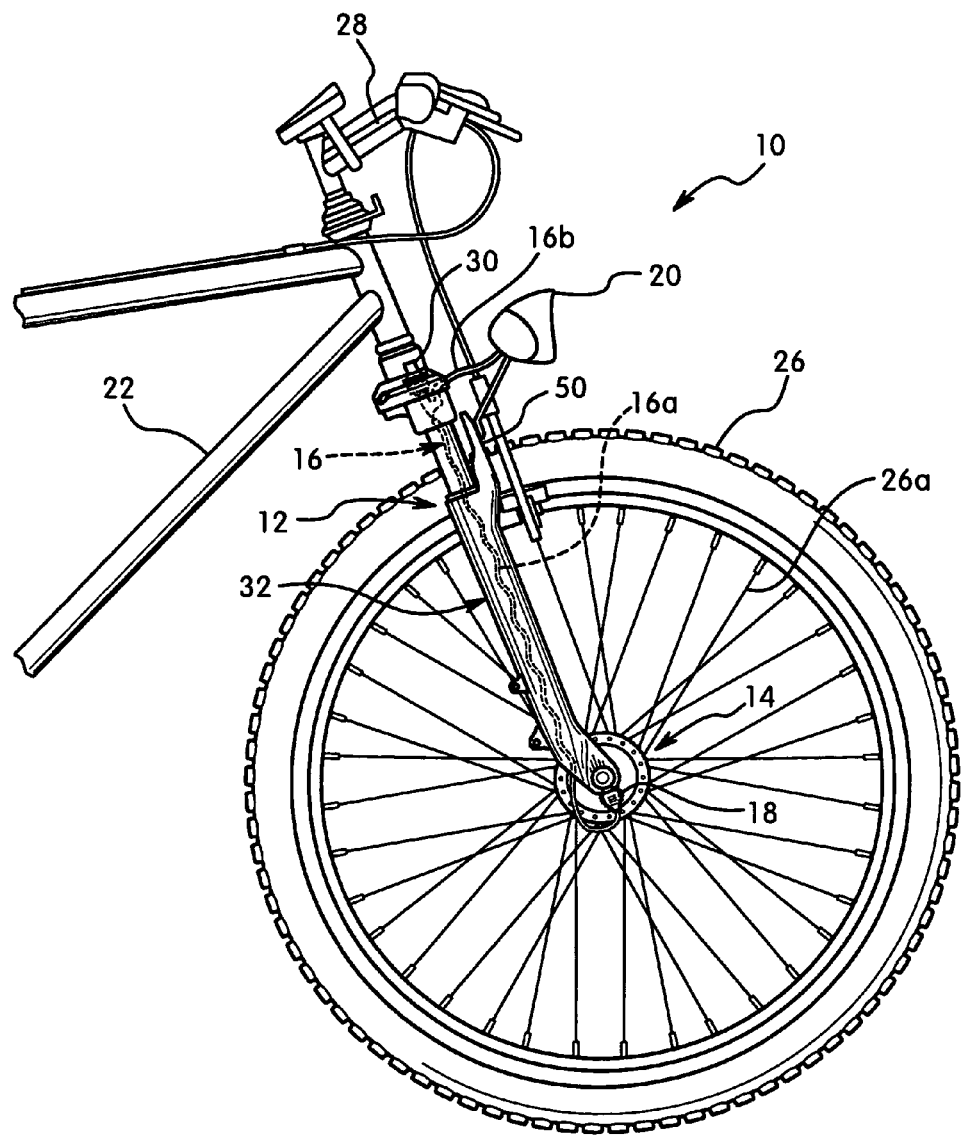
FIG. 1 is a partial, side elevational view of a bicycle with a front bicycle suspension assembly and a front bicycle hub dynamo assembly that utilize a bicycle electrical cord for powering a bicycle lamp in accordance with a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–7, a front portion of a bicycle 10 is illustrated that is equipped with a front suspension fork 12 and a front dynamo hub 14 in accordance with a first embodiment of the present invention. A bicycle electrical cord 16 is installed in the front suspension fork 12 for interconnecting at least two electrical components. Preferably, the bicycle electrical cord 16 is connected to the front dynamo hub 14 (one electrical component) by an electrical cord connector 18 for powering a bicycle lamp 20 (another electrical component) in accordance with a first embodiment of the present invention.

As seen in FIG. 1, the front portion of the bicycle 10 has an upper end of the front suspension fork 12 movably coupled to a main bicycle frame 22 and a lower end of the front suspension fork 12 coupled to the front dynamo hub 14. The front dynamo hub 14 is part of a front wheel 26, which is rotatably mounted to the front suspension fork 12 by the front dynamo hub 14 in conventional manner. A handlebar 28 is fixed to the front suspension fork 12 in a conventional manner to turn the front suspension fork 12 relative to the main bicycle frame 22. The bicycle electrical cord 16 is arranged to extend through an internal area of the front suspension fork 12 as explained below.

Figure 2:
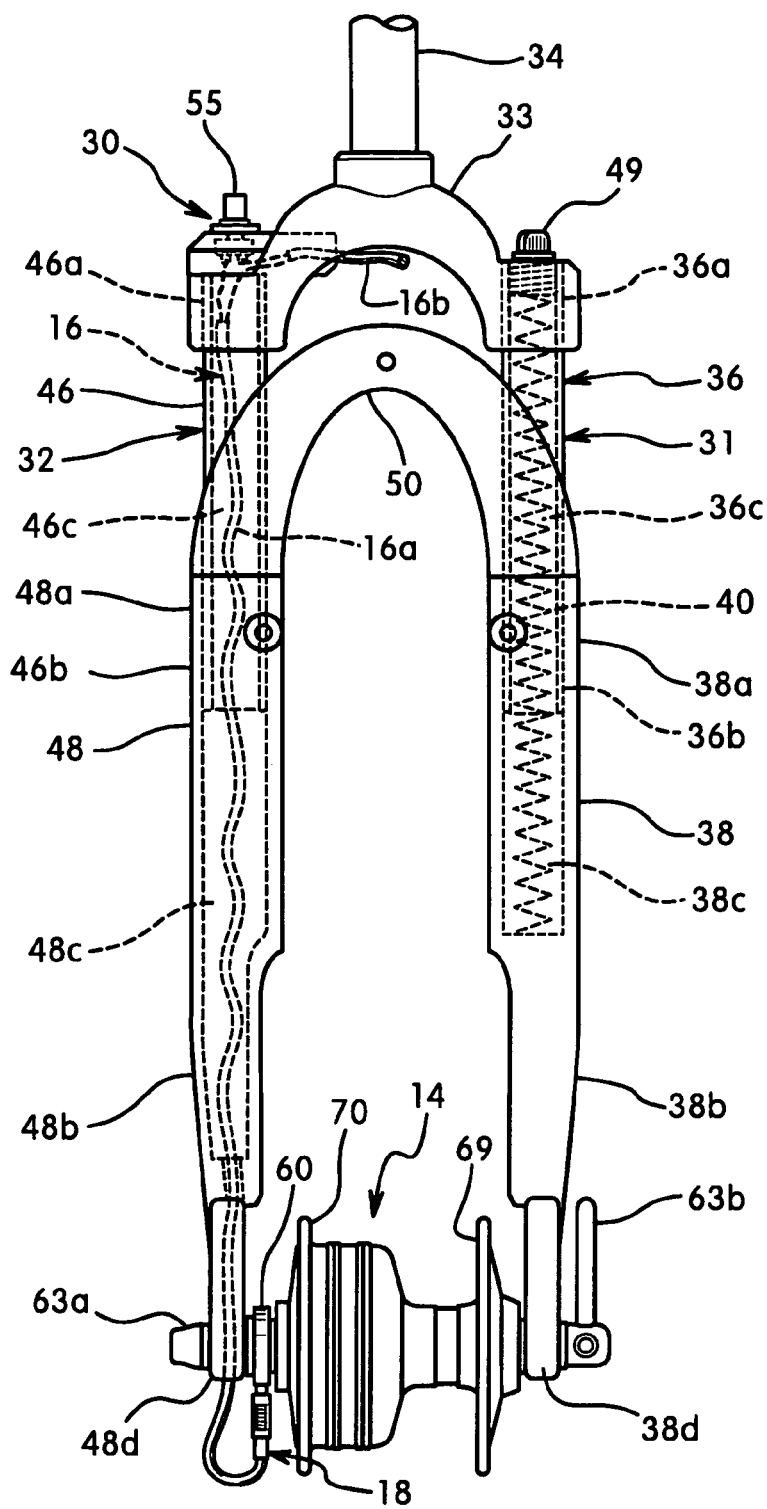
FIG. 2 is a front elevational view of the front suspension fork which includes the front bicycle suspension assembly and the front bicycle hub dynamo assembly for powering the bicycle lamp via the bicycle electrical cord having the bicycle electrical cord connector in accordance with the present invention.
Figure 6:
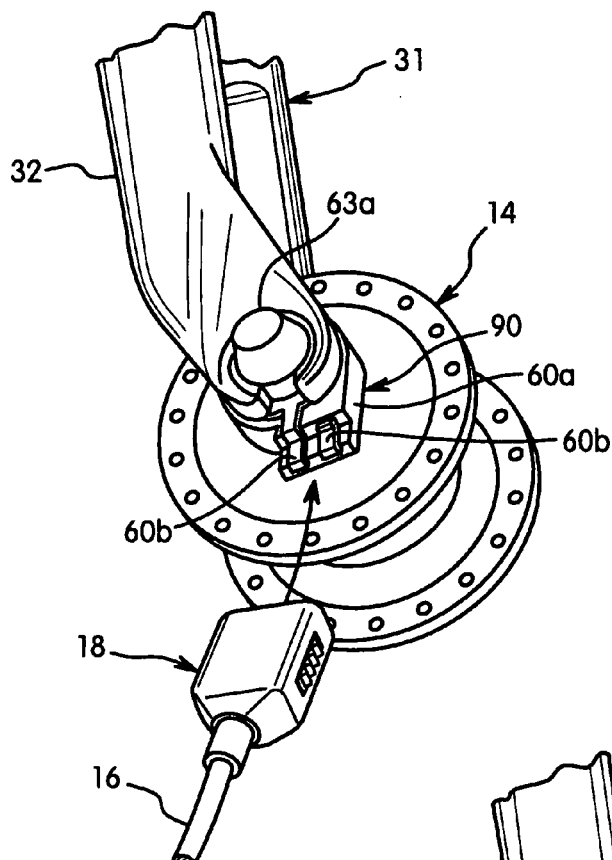
FIG. 6 is a partial side elevational view of a bottom portion of the front suspension fork with the electrical connector of the electrical cord disconnected in accordance with the present invention.
Figure 7:
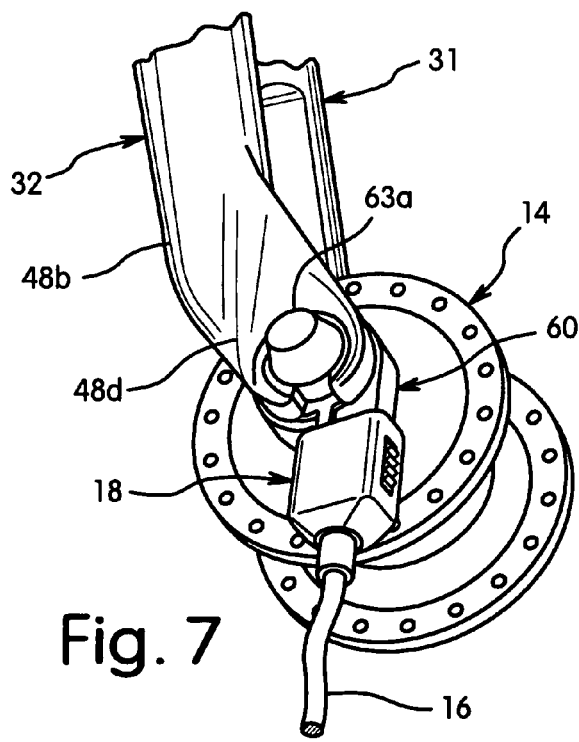
FIG. 7 is a partial enlarged side elevational view of a bottom portion of the front suspension fork in accordance with the present invention.
Figure 8:
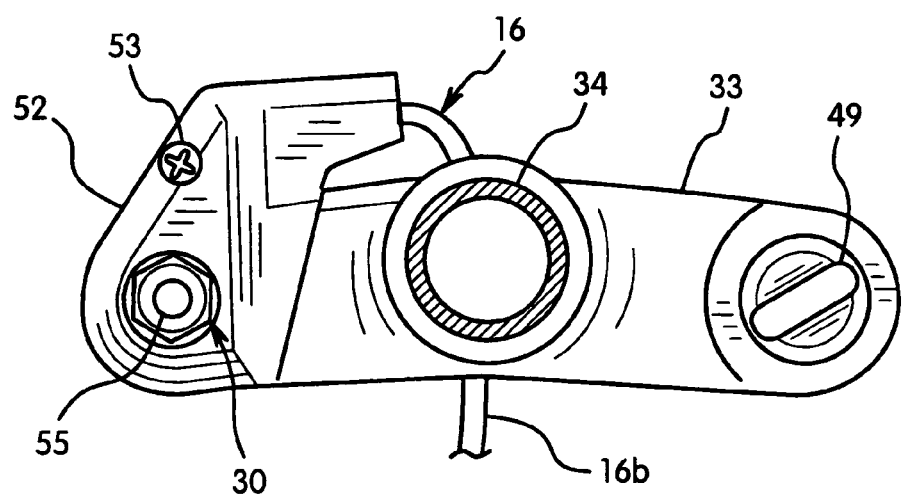
FIG. 8 is a partial top plan view of a top portion of the front suspension fork in accordance with the present invention.
Figure 9:
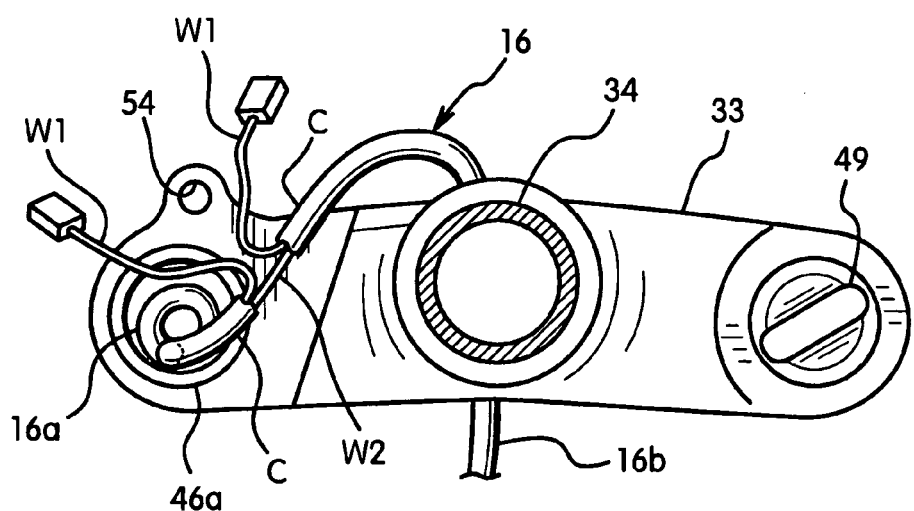
FIG. 9 is a partial top plan-view of the top portion of the front suspension fork in accordance with the present invention with the top cover removed.
Figure 10:
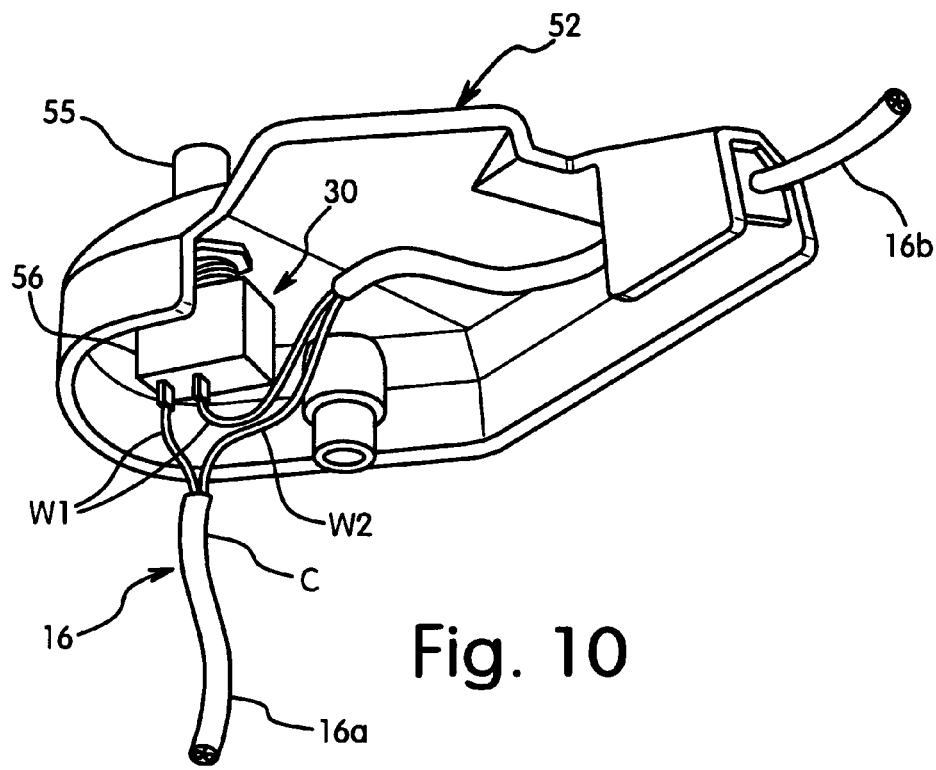
FIG. 10 is an inside plan view of the top cover of the front suspension fork with the switch unit mounted thereto in accordance with the present invention.

In the illustrated embodiment, as best seen in FIGS. 2 and 6–7, the bicycle electrical cord 16 has a first cord portion 16a and a second cord portion 16b with a switch unit 30 electrically coupled between the first and second cord portions 16a and 16b. The first cord portion 16a has a lower end electrically coupled to the front dynamo hub 14 via the electrical cord connector 18 and an upper end electrically coupled to the switch unit 30. The second cord portion 16b has one end electrically coupled to the lamp 20 and the other end electrically coupled to the switch unit 30. The switch unit 30 is mounted on the top of a portion of the front suspension fork 12 as discussed below. The switch unit 30 is used to connect and disconnect electrical power electrically from the front dynamo hub 14 to the bicycle lamp 20.

The front suspension fork 12 basically includes a pair of telescoping struts 31 and 32 that are interconnected by an upper crown 33 which is coupled to a steerer tube 34. The steerer tube 34 is coupled to the main bicycle frame 22 in a conventional manner and has the handlebar 28 coupled to its upper end in a conventional manner. As explained below, the basic constructions of the struts 31 and 32 are identical, except that the strut 31 is configured and arranged to act as a shock absorber and the strut 32 is configured and arranged to act as a protective conduit for protecting the first cord portion of the electrical cord 16.

Figure 4:
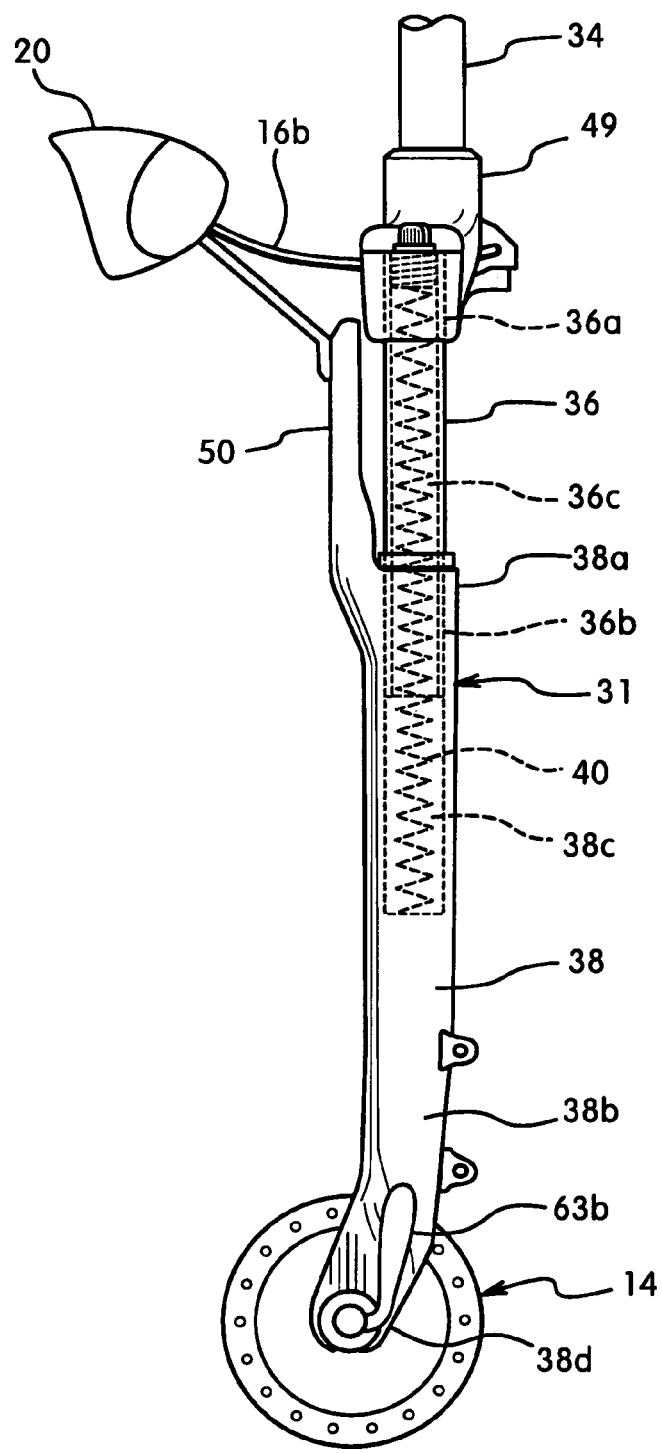
FIG. 4 is a second side elevational view of the front suspension fork in accordance with the present invention with the bicycle lamp and other parts removed for purposes of illustration.
Figure 5:
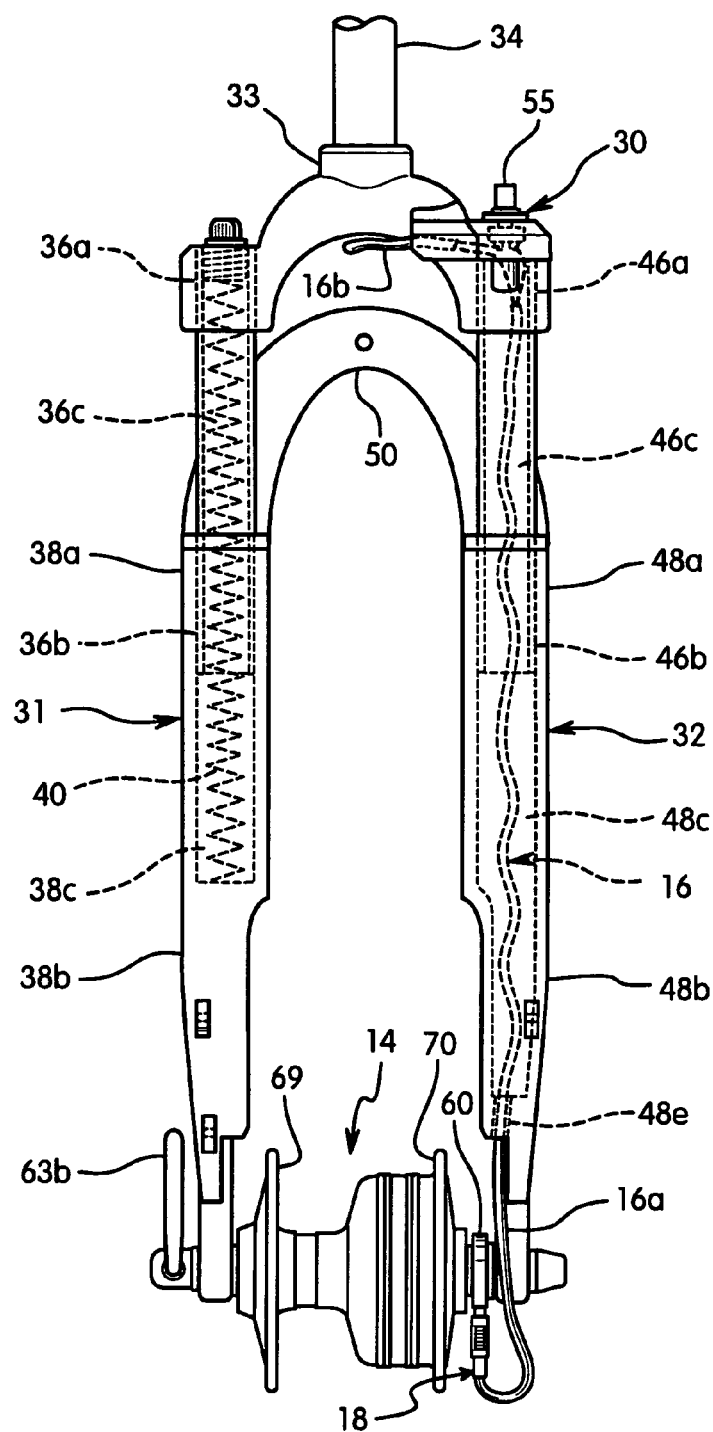
FIG. 5 is a rear elevational view of the front suspension fork in accordance with the present invention with the bicycle lamp and other parts removed for purposes of illustration.

As best seen in FIGS. 2, 4 and 5, the strut 31 includes an inner (upper) telescoping member or tube 36 and an outer (lower) telescoping member or tube 38 telescopically coupled to the inner telescoping tube 36. The inner and outer telescoping tubes 36 and 38 are constructed of hard rigid materials that are conventionally used for struts. The inner and outer telescoping tubes 36 and 38 of the strut 31 are configured and arranged to form a variable volume chamber having a dampening unit 40 located therein. The dampening unit 40 is configured and arranged to absorb impacts on the front suspension fork 12 due to engagement with a rock, a hole, a bump or a like. The dampening unit 40 can be any conventional dampening unit such as one or more compression springs, a combination of dampening elements and/or the like. Accordingly, the dampening unit 40 will not be discussed or illustrated in detail herein.

Basically, the inner telescoping tube 36 includes an upper end portion 36a and a lower end portion 36b with an upper internal passage 36c located between the upper and lower end portions 36a and 36b. The outer telescoping tube 38 includes an upper end portion 38a, a lower end portion 38b and a lower internal passage 38c located between the upper and lower end portions 38a and 38b. The internal passages 36c and 38c form the variable volume chamber with the dampening unit 40 located therein.

The upper end portion 36a of the inner telescoping tube 36 is fixedly coupled to the upper crown 33, while the lower end portion 36b of the inner telescoping tube 36 is slideably coupled within the upper end portion 38a of the outer telescoping tube 38. A seal (not shown) is configured and arranged in a conventional manner between the lower end portion 36b of the inner telescoping tube 36 and the upper end portion 38a of the outer telescoping tube 38 to allow for the relative sliding movement of the inner and outer telescoping tubes 36 and 38. The upper end portion 36a of the inner telescoping tube 36 also has internal treads that adjustably secures an adjustment member 49. The adjustment member seals the opening of the upper end portion 36a of the inner telescoping tube 36. Thus, the variable volume chamber of the strut 31 is a closed chamber.

The outer telescoping tube 38 includes an upper end portion 38a, a lower end portion 38b and a lower internal passage 38c located between the upper and lower end portions 38a and 38b. The lower end portion 38b has a wheel mount or dropout 38d for attaching one end of the front dynamo hub 14 thereto.

Figure 3:
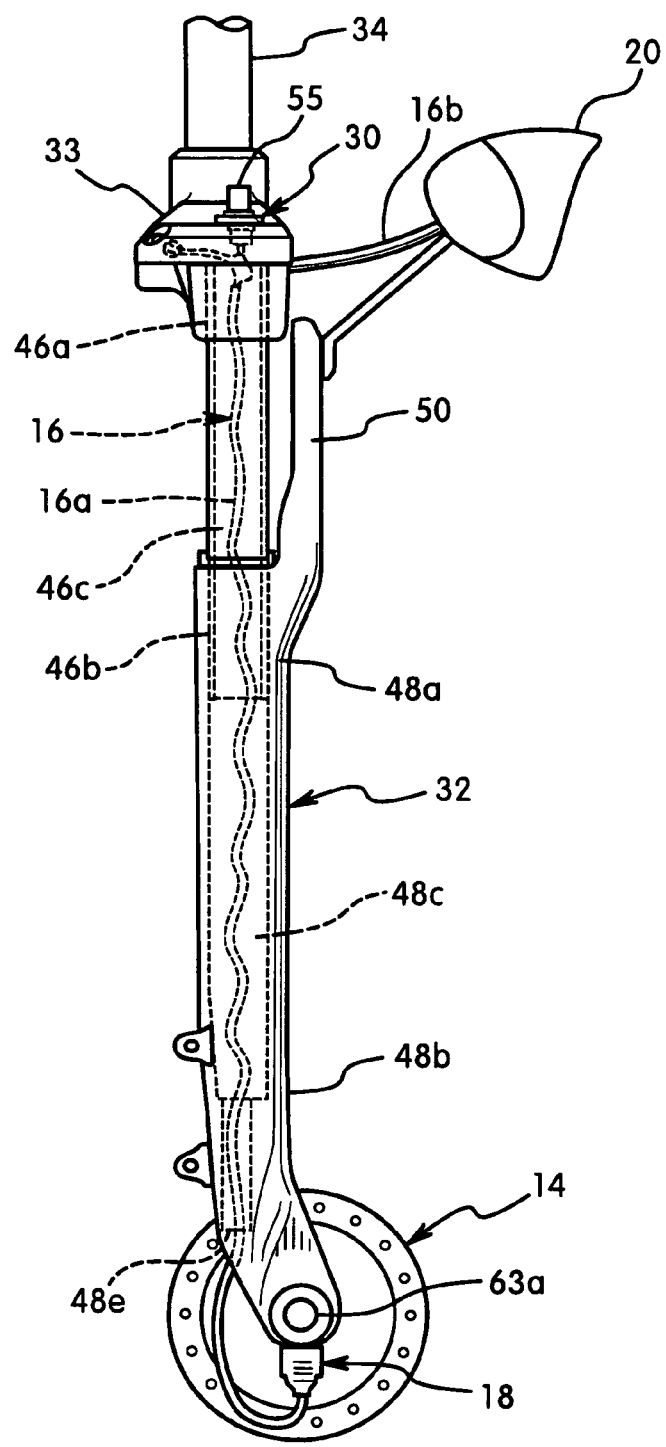
FIG. 3 is a first side elevational view of the front suspension fork in accordance with the present invention with the bicycle lamp and other parts removed for purposes of illustration.

As best seen in FIGS. 2, 3 and 5, the strut 31 contract and expand together with the dampening unit 40 to act as a shock absorber for the entire structure of the front suspension fork 12. More specifically, a telescoping motion occurs between the inner and outer tubes 36 and 38 to compress the dampening unit 40, which is configured and arranged within the inner and outer tubes 36 and 38 to absorb impacts on the front suspension fork 12 due to engagement with a rock, a hole, a bump or a like. In other words, as the telescoping strut 31 is compressed to absorb a shock, the lower end portion 36b of the inner telescoping tube 36 travels towards the lower end portion 38b of the outer telescoping tube 38, thus reducing the volume of the variable volume chamber formed between the inner and outer telescoping tubes 36 and 38. Similarly, when the telescoping strut 31 expands to return to its neutral position, the lower end portion 36a of the inner telescoping tube 36 travels away from the lower end portion 38b of the outer telescoping tube 38 to increase the volume of the variable volume chamber formed by the inner and outer telescoping tubes 36 and 38.

Preferably, the strut 32 does not include a dampening unit, but rather has the first cord portion 16a of the electrical cord 16 running therethrough. Of course, if needed and/or desired, a second dampening unit can be installed in the strut 32 that does not interfere with the electrical cord 16. The strut 32 basically includes an inner (upper) telescoping member or tube 46 and an outer (lower) telescoping member or tube 48 telescopically coupled to the inner telescoping tube 46. The inner and outer telescoping tubes 46 and 48 are constructed of hard rigid materials that are conventionally used for struts. The inner and outer telescoping tubes 46 and 48 of the strut 32 are configured and arranged to form a variable volume chamber having a majority of the first cord portion 16a of the electrical cord 16 located therein.

The outer telescoping tubes 38 and 48 are interconnected by a bridge member 50 that is integrally formed with the outer telescoping tubes 38 and 48. Of course, it will be apparent to those skilled in the art that the bridge member 50 can be a separate member that is fixed to the outer telescoping tubes 38 and 48. Thus, the bridge member 50 interconnects the struts 31 and 32 together such that they act as a single unit. In other words, the struts 31 and 32 contract and expand together with the dampening unit 40 acting as a shock absorber for the entire structure of the front suspension fork 12. More specifically, a telescoping motion occurs between the inner tubes 36 and 46 and the outer tubes 38 and 48 to compress the dampening unit 40. Accordingly, the dampening unit 40 is configured and arranged to absorb impacts on the front suspension fork 12 due to engagement with a rock, a hole, a bump or a like.

Basically, the inner telescoping tube 46 includes an open upper end portion 46a and an open lower end portion 46b with an upper internal passage 46c located between the upper and lower end portions 46a and 46b. The outer telescoping tube 48 includes an upper end portion 48a, a lower end portion 48b and a lower internal passage 48c located between the upper and lower end portions 48a and 48b. The internal passages 46c and 48c form an enclosed chamber with the first cord portion 16a of the electrical cord 16 extending therethrough. The first cord portion 16a of the electrical cord 16 is configured and arranged within the internal passages 46c and 48c of the telescoping tubes 46 and 48 such that sufficient slack is provided in the first cord portion 16a to accommodate expansion and contraction of the inner and outer telescoping tubes 46 and 48.

Figure 11:
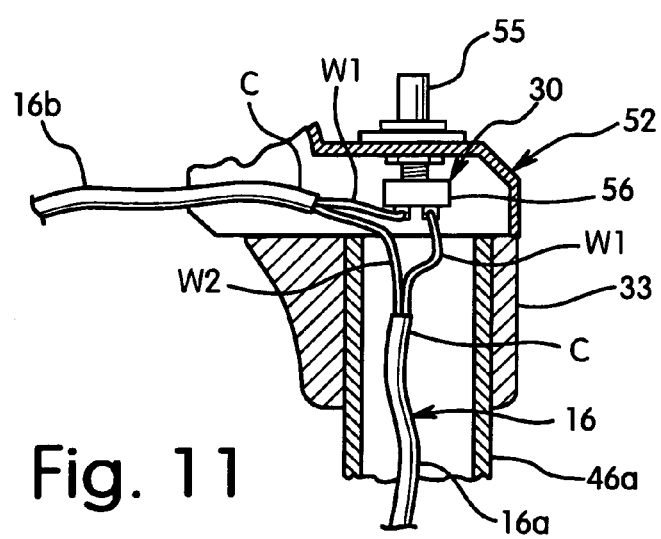
FIG. 11 is a partial cross-sectional view of the top portion of the top cover, the upper crown and one of the inner tubes in accordance with the present invention.

The upper end portion 46a of the inner telescoping tube 46 is fixedly coupled to the upper crown 33, while the lower end portion 46b of the inner telescoping tube 46 is slideably coupled within the upper end portion 48a of the outer telescoping tube 48. The inner telescoping tube 46 is open at its upper end such that an upper end portion of the first cord portion 16a of the electrical cord 16 extends outwardly therefrom for connection with the switch unit 30 as seen in FIG. 11. A seal (not shown) is provided between the lower end portion 46b of the inner telescoping tube 46 and the upper end portion 48a of the outer telescoping tube 48 in a conventional manner to allow the relative sliding movement of the inner and outer telescoping tubes 46 and 48.

Figure 12:
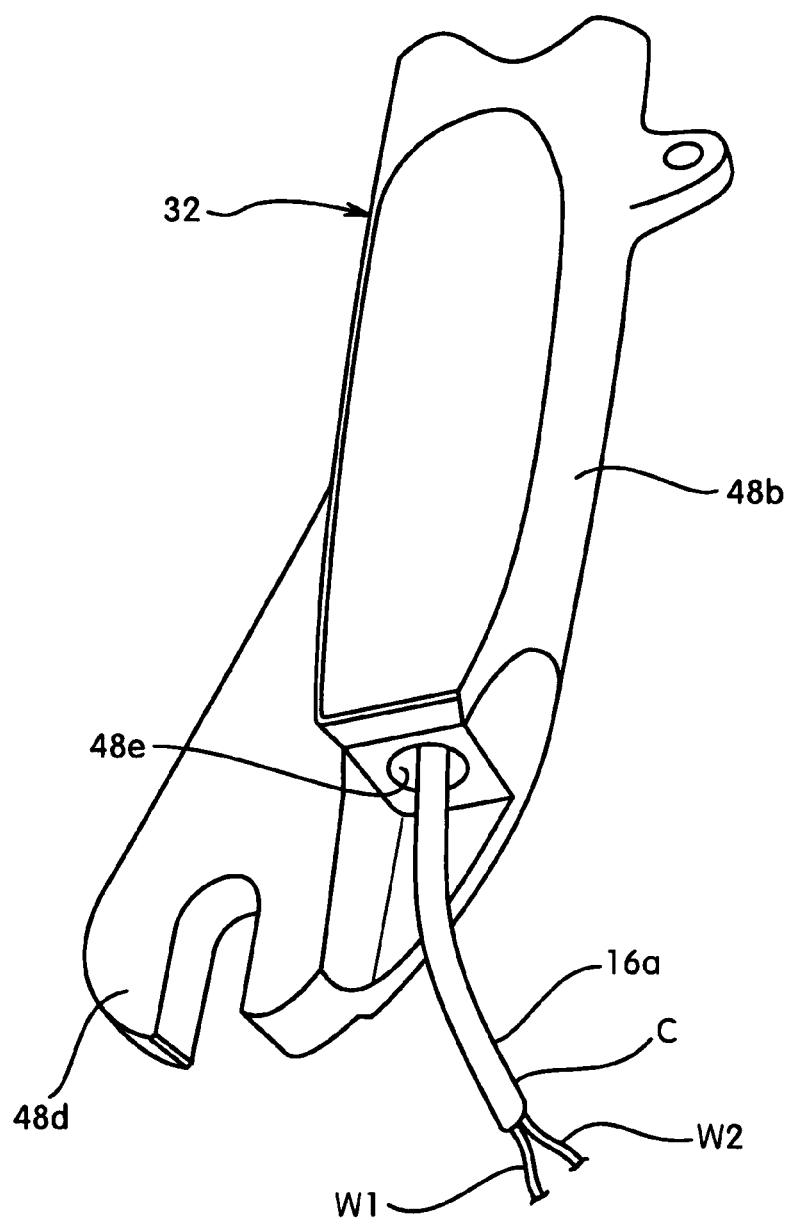
FIG. 12 is a partial perspective view of the bottom of the outer tube with the electrical extending outwardly therefrom.

The outer telescoping tube 48 includes an upper end portion 48a, a lower end portion 48b and a lower internal passage 48c located between the upper and lower end portions 48a and 48b. The lower end portion 48b has a wheel mount or dropout 48d for attaching one end of the front dynamo hub 14 thereto. Also as best seen in FIG. 12, the outer telescoping tube 48 is provided with a cord opening 48e at its lower end such that a lower end portion of the first cord portion 16a of the electrical cord 16 extends outwardly from the lower internal passage 48c of the outer telescoping tube 48.

Referring now to FIGS. 8–11, the upper crown 33 includes a top cover 52 that is fixedly coupled thereto for covering the upper open end of the inner telescoping tube 46. Preferably, the top cover 52 is secured to the upper crown 33 by a fastener such as a screw 53 that threads into an internally threaded hole 54 formed in the upper crown 33. Thus, the top cover 52 is configured and arranged to be selectively removed from a position covering the upper end opening of the inner telescoping tube 46 for accessing the switch unit 30.

The switch unit 30 is preferably fixedly coupled to the top cover 52. The switch unit 30 includes a push button switch 55 that projects outwardly from an upper surface of the top cover 52 and an electrical connector 56 protruding downwardly from an inner surface of the top cover 52. Preferably, the electrical connector 56 of the switch unit 30 projects into partially into the upper end portion 46a of the inner telescoping tube 46. The electrical connector 56 is electrically coupled to the electrical cord 16 that is connected between the front dynamo hub 14 and the bicycle lamp 20. The push button switch 55 is a conventional switch that is selectively pushed to connect and disconnect a pair of electrical contacts (not shown) in the electrical connector 56. In other words, electrical power to the lamp 20 is interrupted by pushing the push button switch 55 when the push button switch 55 is in the contact closed position that supplies electrical power to the lamp 20. The push button switch 55 is pushed again to disconnect electrical power to the lamp 20 when the push button switch 55 is in the contact open position that interrupts electrical power to the lamp 20.

Referring now to FIGS. 1–3, 5, 6, 7, 10–12 and 16–19, the electrical cord 16 is a conventional electrical cord with a pair of insulated conductor wires W1 and W2 having an outer elastomeric cover or sheath C. In the area of the switch unit 30, the elastomeric cover or sheath C of the electrical cord 16 is split into two pieces that define the first and second cord portions 16a and 16b.

As best seen in FIGS. 1–3, the first cord portion 16a of the electrical cord 16 is located in the internal passages 46c and 48c of the inner and outer telescoping tubes 46 and 48, and is arranged with sufficient slack to accommodate expansion and contraction of the inner and outer telescoping tubes 46 and 48. Thus, the first cord portion 16a of the electrical cord 16 is protected and does not interfere with the normal operation of the bicycle 10 and its components.

As seen in FIGS. 5–7 and 16–19, the lower ends of the conductor wires W1 and W2 are electrically coupled to the electrical connector 18 as discussed below. The upper ends of the conductor wires W1 and W2 are electrically coupled to the lamp 20 using conventional push clips (not shown). The conductor wire W1 is split into two pieces with the switch unit 30 electrically coupling the two pieces of conductor wire W1 together. In particular, the electrical contacts (not shown) in the electrical connector 56 are connected to the two pieces of the conductor wire W1.

Figure 13:
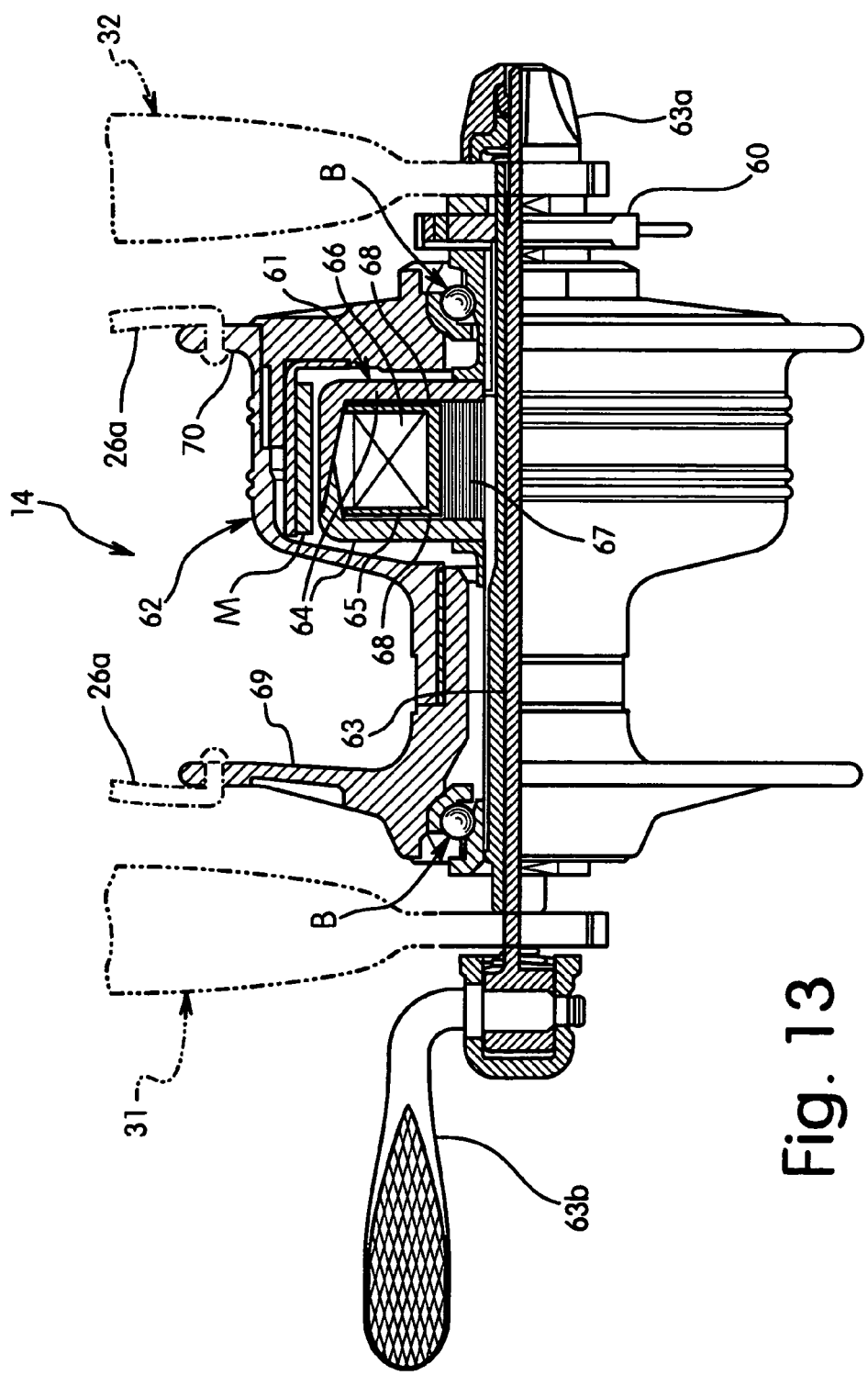
FIG. 13 is a rear elevational view of the front hub with the top half shown in cross section in accordance with the present invention.

Referring now to FIG. 13, the front dynamo hub 14 is preferably a substantially conventional member, except for its electrical connector 60. Thus, the front dynamo hub 14 will not be discussed or illustrated in detail herein.

Figure 19:
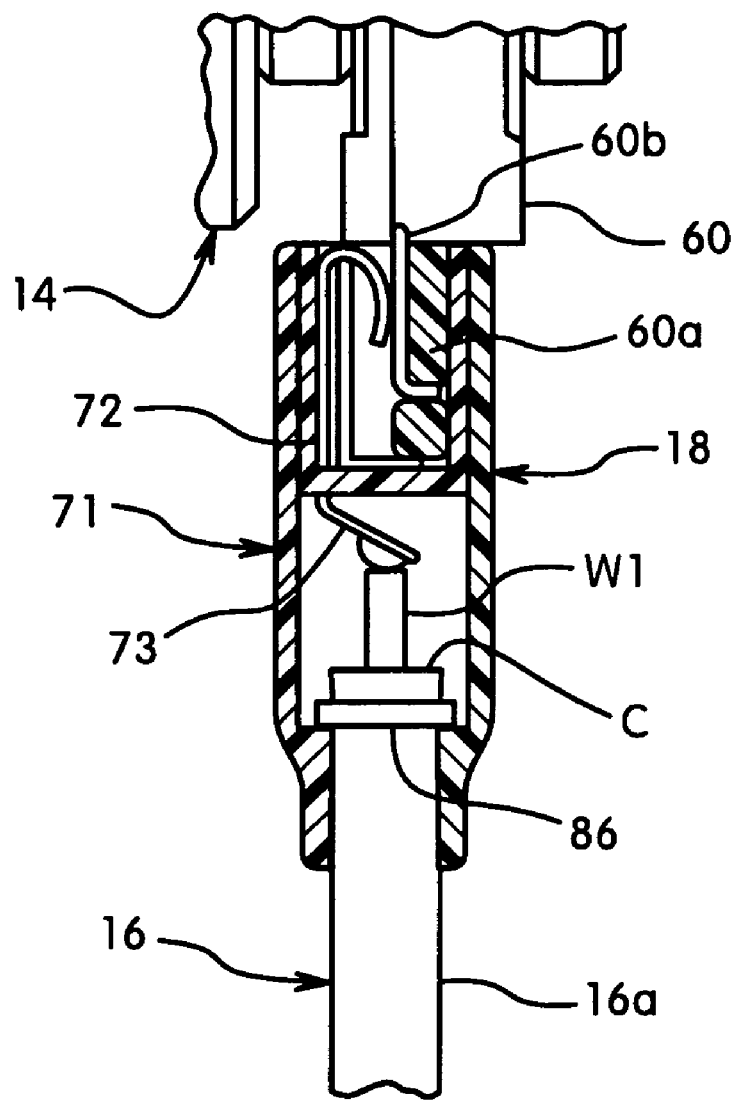
FIG. 19 is a cross sectional view of the electrical connector, similar to FIG. 18, but coupled to the electrical connector of the hub dynamo in accordance with the present invention.
Figure 20:
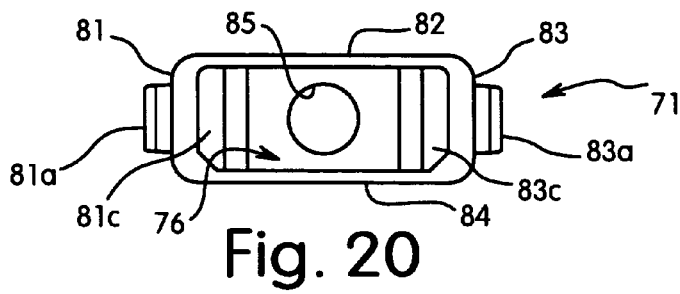
FIG. 20 is a top plan view of the outer housing part of the electrical cord connector in accordance with the present invention.
Figures 21, 22, 23:
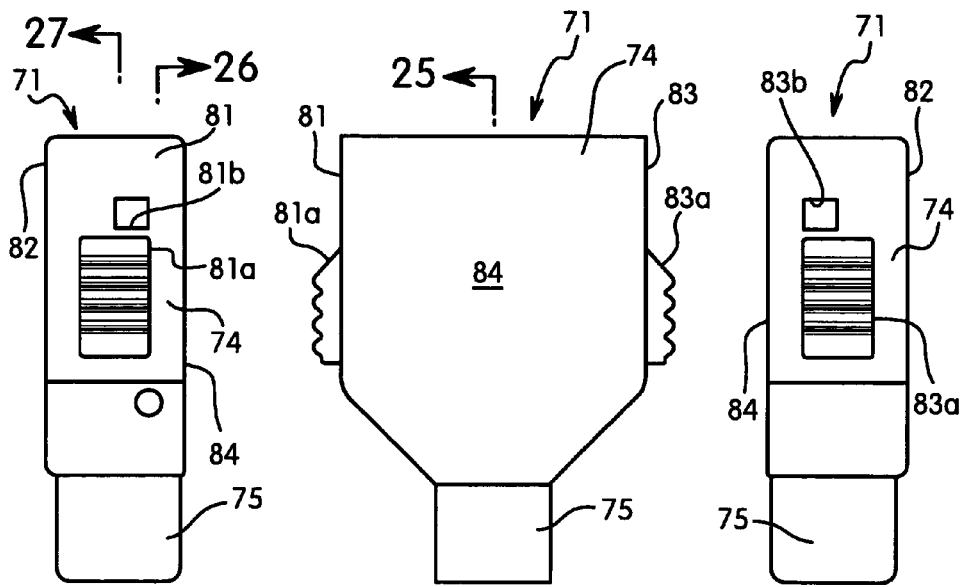
FIG. 21 is a first edge elevational view of the outer housing part of the electrical cord connector in accordance with the present invention.
FIG. 22 is a side elevational view of the outer housing part of the electrical cord connector in accordance with the present invention.
FIG. 23 is a second edge elevational view of the outer housing part of the electrical cord connector in accordance with the present invention.
Figure 24:
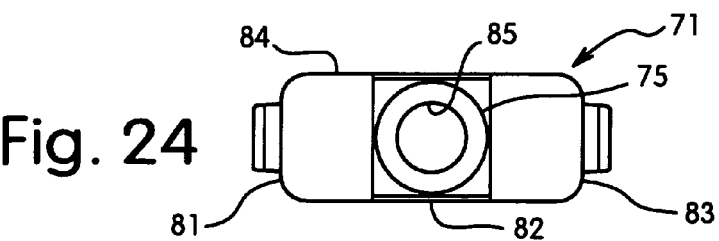
FIG. 24 is a bottom plan view of the outer housing part of the electrical cord connector in accordance with the present invention.
Figure 33:
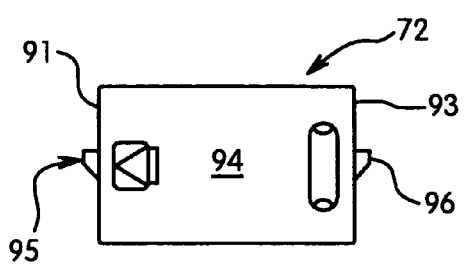
FIG. 33 is a second side elevational view of the inner housing part of the electrical cord connector in accordance with the present invention.
Figure 34:
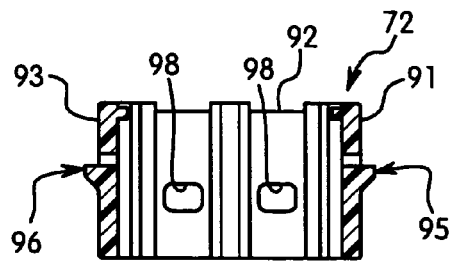
FIG. 34 is a first cross-sectional view of the inner housing part of the electrical cord connector as seen along section line 34—34 of FIG. 31 in accordance with the present invention.
Figure 35:
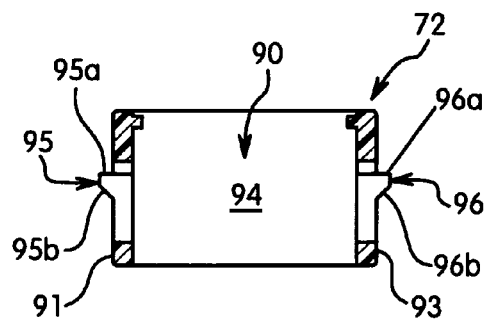
FIG. 35 is a second cross-sectional view of the inner housing part of the electrical cord connector as seen along section line 35—35 of FIG. 29 in accordance with the present invention.
Figure 36:
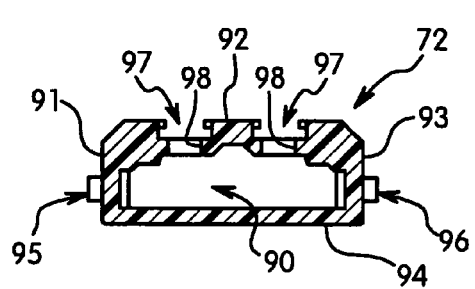
FIG. 36 is a third cross-sectional view of the inner housing part of the electrical cord connector as seen along section line 36—36 of FIG. 30 in accordance with the present invention.
Figure 37:
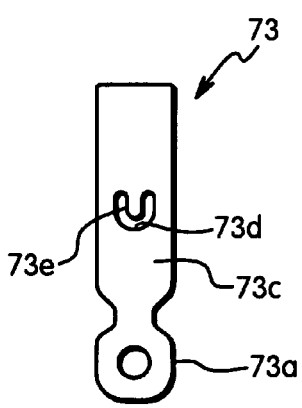
FIG. 37 is first side elevational view of one of the electrical contacts for the electrical cord connector in accordance with the present invention.
Figure 38:
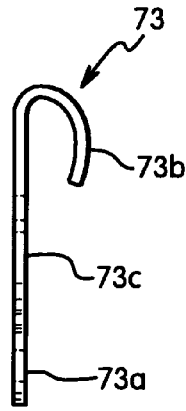
FIG. 38 is an edge elevational view of one of the electrical contacts of the electrical cord connector in accordance with the present invention.
Figure 39:
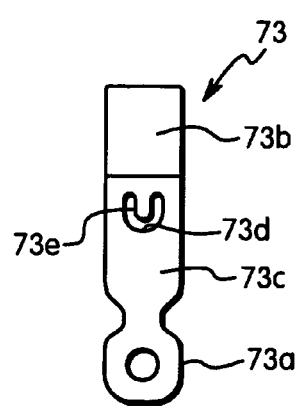
FIG. 39 is a second side elevational view of one of the electrical contacts of the electrical cord connector in accordance with the present invention.

As seen in FIGS. 6, 7 and 19, the electrical connector 60 has an insulating body portion 60a and a pair of electrical contacts 60b that are electrically coupled to a dynamo portion of the front dynamo hub 14 in a conventional manner. The insulating body portion 60a supports the electrical contacts 60b in a protected manner for coupling with the electrical connector 18 as seen in FIG. 19. The electrical connector 60 is configured and arranged as a male connector.

Basically, the front dynamo hub 14 comprises an internal stator assembly 61 and an external rotor assembly 62 that form the dynamo portion of the front dynamo hub 14. The internal stator assembly 61 comprises a hub axle 63, a pair of stator yokes 64, a bobbin 65 with a wound coil 66, a cylindrical core yoke 67 and two separate disks 68.

The internal stator assembly 61 is fixed to the front suspension fork 12 by the hub axle 63. The hub axle 63 is preferably a quick release hub axle having an adjustment nut 63a coupled to one end and a cam lever 63b coupled to the other end. The electrical connector 60, the stator yokes 64, the cylindrical core yoke 67 and the separation disks 68 are all fixed to this hub axle 63 so they do not rotate with the wheel 26.

The external rotor assembly 62 comprises a pair of frame portions 69 and a cap 70 integrated as shown in FIG. 13. The external rotor assembly 62 is rotatably fixed to the hub axle 63 with the aid of bearings B. The flanges formed on the outer peripheral portion of the frame portions 69 are attached to a plurality of spokes 26a of the front wheel 26. A permanent magnet M comprising four magnets spaced at equal intervals in the circumferential direction is fixed to the cap 70. In this permanent magnet M, the north (N) and south (S) poles are intermittently formed at equally spaced intervals. A total of twenty-eight poles of each type face the stator yokes 64. The operation of the front dynamo hub 14 is explained in more detail in U.S. Pat. No. 6,409,197 (assigned to Shimano, Inc.).

Referring now to FIGS. 14–19, the electrical connector 18 is configured and arranged as a female connector. The electrical cord connector 18 includes an outer housing part 71, an inner housing part 72 and a pair of electrical contacts 73. Preferably, each of the inner and outer housing parts 71 and 72 is constructed as a one-piece, unitary member from an insulating plastic material such that the outer and inner housing parts 71 and 72 insulate the contacts 73 from each other. Preferably, the material of the inner and outer housing parts 71 and 72 is a rigid insulating material with limited flexibility. The inner and outer housing parts 71 and 72 are connected together by a snap fit as explained below with the electrical contacts retained between abutting surfaces of the inner and outer housing parts 71 and 72.

Referring now to FIGS. 20–27, the outer housing part 71 is preferably a one piece, unitary member that has a main body section 74 and a cord receiving section 75 that are integrally formed as a one piece, unitary member. The main body section 74 has a substantially rectangular outer cross-sectional shape with an internal space or cavity 76 that is sized to retain the inner housing part 72 therein. Thus, the main body section 74 has first end wall 81, a first side wall 82, a second end wall 83 and a second side wall 84 that define the rectangular cavity 76 that receives and retains the inner housing part 72. The end wall 81 is provided with a gripping tab 81a and a retaining opening 81b. The end wall 83 is provided with a gripping tab 83a and a retaining opening 83b. Also, the interior surfaces of the end walls 81 and 83 are preferably step shaped to form two abutments 81c and 83c, respectively, which limit the movement of the inner housing part 72 when the inner housing part 72 is being snap fitted into the outer housing part 71.

The cord receiving section 75 has a substantially cylindrical cord receiving bore 85 that is in communication with the interior cavity 76 of the main body section 71. The cord receiving bore 85 has a lower portion of the electrical cord 16 located therein. Preferably, the interface between the cover C of the electrical cord 16 and cord receiving bore 85 is watertight. A cord retaining ring 86 is located on the lower portion of the electrical cord 16 that is located in the interior cavity 76 of the main body section 74 to prevent the electrical cord 16 from being pulled out of the electrical connector 18.

Referring now to FIGS. 28–36, the inner housing part 72 has a substantially rectangular overall exterior shape in cross-section that is dimensioned to be press-fitted into the interior cavity 76 of the outer housing part 71 by a snap fit. In particular, the inner housing part 72 has a first end wall 91, a first side wall 92, a second end wall 93 and a second side wall 94 that are sized slightly smaller than the interior cavity 76 of the outer housing part 71. Theses walls define a connector receiving recess or cavity 90 that is dimensioned to frictionally retain the connector 60 of the front dynamo hub 14 therein.

The end wall 91 includes a retaining protrusion 95 that is a generally triangularly shaped member that include an abutment surface 95a extending perpendicular to the end wall 91 and a ramp surface 95b that is inclined to the end wall 91. The end wall 93 includes a retaining protrusion 96 that is a generally triangularly shaped member that include an abutment surface 96a extending perpendicular to the end wall 91 and a ramp surface 96b that is inclined to the end wall 93. The ramp surfaces 95b and 96b are designed to allow easier insertion of the inner housing part 72 into the internal cavity 76 of the outer housing part 71. When the inner housing part 72 is inserted into the outer housing part 71, the protrusions 95 and 96 are received in the retaining openings 81b and 83b of the outer housing part 71. Preferably, the protrusions 95 and 96 are attached in a cantilevered fashion to the end walls 91 and 93 such that the protrusions 95 and 96 are resiliently coupled to the end walls 91 and 93 to flex inwardly relative to the longitudinal axis of the inner housing part 72 when the inner housing part 72 is inserted into the interior cavity 76 of the outer housing part 71.

The side wall 92 has a pair of contact receiving grooves 97 and a pair of through openings 98. The contact receiving grooves 97 are configured and arranged to tightly receive the electrical contacts 73 therein. The through openings 98 are configured and arranged in the side wall 92 along center portions of the contact receiving grooves 97. These openings 98 allow the electrical contacts 73 to be deformed for fixedly securing the electrical contacts 72 to the inner housing part 72 as discussed below.

Referring now to FIGS. 16–19 and 37–39, the electrical contacts 73 are preferably identical. Thus, each of the contacts 73 has a wire connection end 73a and an electrical contact end 73b with a center section 73 extending between the wire connection end 73a and the electrical contact end 73b. Preferably, the electrical contacts 73 are constructed as a one-piece, unitary member from a metallic sheet material having good electrical conductive characteristics.

Figure 17:
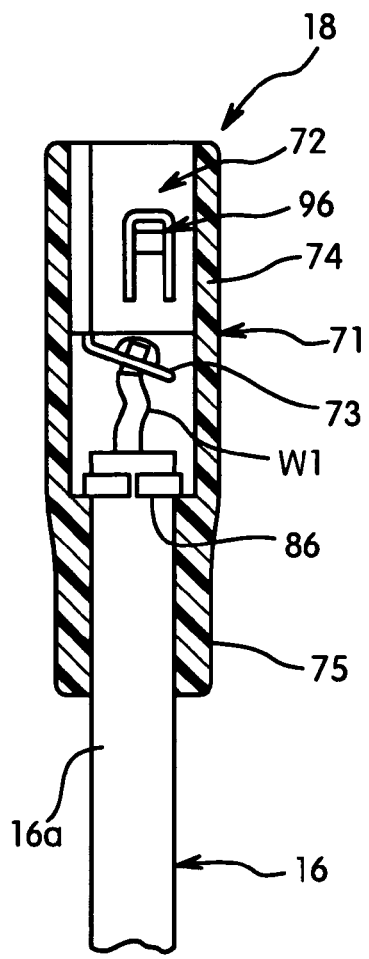
FIG. 17 is a cross sectional view of the electrical connector as seen along section line 17—17 of FIG. 15 in accordance with the present invention.
Figure 18:
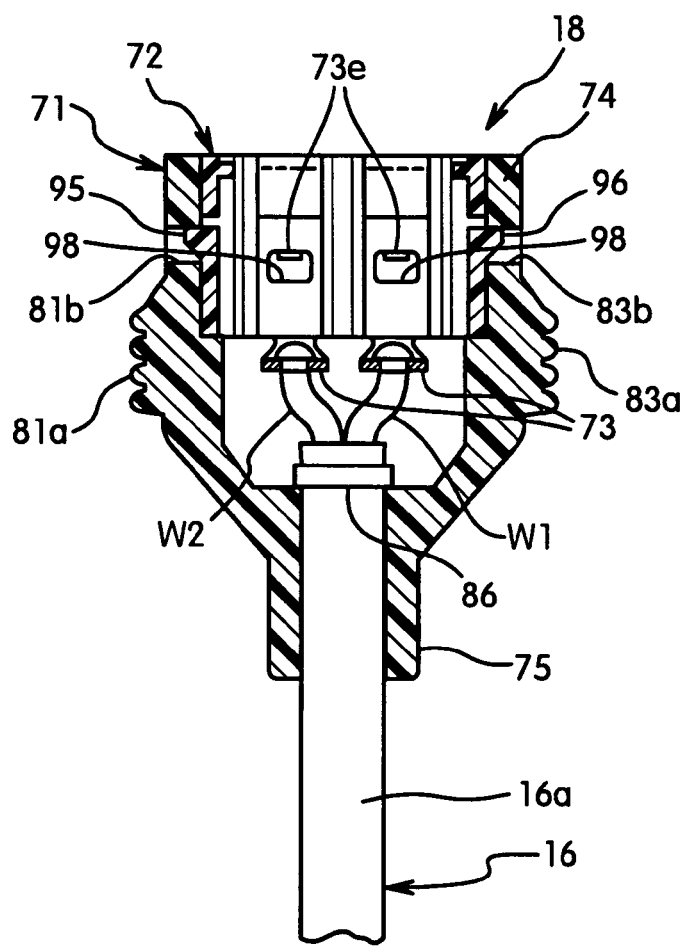
FIG. 18 is a cross sectional view of the electrical connector as seen along section line 18—18 of FIG. 15 in accordance with the present invention.

The wire connection end 73a is provided with a hole for receiving one of the conductors of the conductor wires W1 and W2 that is preferably soldered thereto. The connection end 73a is also preferably provided with a reduced section so that the connection end 73a can be deformed or bent out of the initial plane of a center section 73c of the contact 73 of as shown in FIG. 17. The contact end 73b is preferably U-shaped such that the free end of the contact end 73b is cantilevered to be resiliently deflected towards the center section 73c of the contact 73 when the electrical connector 18 is connected to the electrical connector 60 of the front dynamo hub 14 as seen in FIG. 19. In particular, when the contacts 73 are slide into the contact receiving grooves 97 of the inner housing part 72, the contact ends 73b extend around a front edge of the side wall 92 and then the free end of the contact ends 73b extend rearwardly into the interior cavity 76 of the inner housing part 72. The portions of the contact ends 73b located in the interior cavity 76 of the inner housing part 72 are spaced from the interior surface of the side wall 92 of the inner housing part 72. This arrangement allows the contact ends 73b to be resiliently deflected towards the interior surface of the side wall 92 of the inner housing part 72 when the electrical connector 18 is connected to the electrical connector 60 of the front dynamo hub 14 as seen in FIG. 19.

Each electrical contact 73 is also provided with a cutout 73d in the center section 73c to form a retain tab 73e. The retaining tabs 73e are designed to be bent or deformed into the openings 98 of the side wall 92 of the inner housing part 72 to secure the contacts 73 to the inner housing part 72 prior to the inner housing part 72 being coupled to the outer housing part 71.

The bicycle lamp 18 is a conventional bicycle lamp. Thus, bicycle lamp 18 will not be discussed or illustrated in detail herein. However, the bicycle lamp 18 is powered by the electrical energy generated by the front dynamo hub 14.

The bicycle 10 and its various components are well known in the prior art, except for those components that relate to the present invention. Thus, the bicycle 10 and its various components will not be discussed or illustrated in detail herein, except for those components that relate to the present invention.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle suspension assembly comprising:
    a first inner telescoping member including a first upper end portion and a first lower end portion with a first upper internal passage located between the first upper and lower end portions;
    a second inner telescoping member including a second upper end portion and a second lower end portion;
    a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;
    a second outer telescoping member slideably coupled to the second lower end portion of the second inner telescoping member between an extended position and a retracted position and fixedly coupled to the first outer telescoping member; and
    an electrical cord located in the first upper internal passage and the first lower internal passage, the first upper internal passage and the first lower internal passage forming an entire length, and the electrical cord extending through at least a majority of the entire length.

2. The bicycle suspension assembly according to claim 1, wherein
    the first outer telescoping member has a cord opening with a lower end of the electrical cord extending outwardly therefrom.

3. The bicycle suspension assembly according to claim 2, wherein
    the cord opening is located on a downwardly facing surface of the first outer telescoping member.

4. The bicycle suspension assembly according to claim 1, wherein
    the electrical cord is electrically coupled to a front dynamo hub.

5. The bicycle suspension assembly according to claim 1, wherein
    the second inner and outer telescoping members include a shock absorbing member operatively coupled therebetween.

6. The bicycle suspension assembly according to claim 5, wherein
    the first inner and outer telescoping members do not include a shock absorbing member operatively coupled therebetween.

7. The bicycle suspension assembly according to claim 1, wherein
    the first inner and outer telescoping members do not include a shock absorbing member operatively coupled therebetween.

8. The bicycle suspension assembly according to claim 1, wherein
    the electrical cord has an upper end electrically coupled to a first electrical component and a lower end electrically coupled to a second electrical component.

9. The bicycle suspension assembly according to claim 1, wherein
    an upper end of the electrical cord is electrically coupled to an electrical component by a switch unit mounted on the first upper end portion of the first inner telescoping member.

10. The bicycle suspension assembly according to claim 1, wherein
    the electrical cord is configured and arranged within the first upper internal passage and the first lower internal passage with slack to accommodate expansion and contraction of the first and second inner telescoping members relative to the first and second outer telescoping members.

11. The bicycle suspension assembly according to claim 1, wherein
    the electrical cord is electrically coupled to a control unit that is configured and arranged to control an operation of an electrical component.

12. The bicycle suspension assembly according to claim 11, wherein
    the control unit is mounted on the first upper end portion of the first inner telescoping member.

13. The bicycle suspension assembly according to claim 12, wherein
    the control unit is a switch unit and the electrical component is a lamp.

14. The bicycle suspension assembly according to claim 11, wherein
    the second inner and outer telescoping members include a shock absorbing member operatively coupled therebetween.

15. The bicycle suspension assembly according to claim 14, wherein
    the first inner and outer telescoping members do not include a shock absorbing member operatively coupled therebetween.

16. The bicycle suspension assembly according to claim 11, wherein
    the electrical cord is configured and arranged within the first upper internal passage and the first lower internal passage with slack to accommodate expansion and contraction of the first and second inner telescoping members relative to the first and second outer telescoping members.

17. A bicycle suspension assembly comprising:
    a first inner telescoping member including a first upper end portion and a first lower end portion with a first upper internal passage located between the first upper and lower end portions;
    a second inner telescoping member including a second upper end portion and a second lower end portion;
    a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, the first inner and outer telescoping members not including a shock absorbing member operatively coupled therebetween.

18. The bicycle suspension assembly according to claim 17, wherein the second inner and outer telescoping members include a shock absorbing member operatively coupled therebetween.

19. The bicycle suspension assembly according to claim 18, wherein the electrical cord is electrically coupled to a control unit that is configured and arranged to control an operation of an electrical component.

20. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, the electrical cord being configured and arranged within the first upper internal passage and the first lower internal passage with slack therein to accommodate expansion and contraction of the first and second inner telescoping members relative to the first and second outer telescoping members.

21. The bicycle suspension assembly according to claim 20, wherein the electrical cord is electrically coupled to a control unit that is configured and arranged to control an operation of an electrical component.

22. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, the first outer telescoping member having a cord opening with a lower end of the electrical cord extending outwardly therefrom.

23. The bicycle suspension assembly according to claim 22, wherein the cord opening is located on a downwardly facing surface of the first outer telescoping member.

24. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage and electrically coupled to a front dynamo hub.

25. The bicycle suspension assembly according to claim 24, wherein the electrical cord is electrically coupled to a control unit that is configured and arranged to control an operation of an electrical component.

26. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, an upper end of the electrical cord being electrically coupled to an electrical component by a switch unit mounted on the first upper end portion of the first inner telescoping member.

27. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, the electrical cord being electrically coupled to a control unit that is configured and arranged to control an operation of an electrical component, the control unit being mounted on the first upper end portion of the first inner telescoping member.

28. A bicycle suspension assembly comprising:

a first inner telescoping member including a first upper end portion and a first lower end portion with a first upper internal passage located between the first upper and lower end portions;

a second inner telescoping member including a second upper end portion and a second lower end portion;

a first outer telescoping member slideably coupled to the first lower end portion of the first inner telescoping member between an extended position and a retracted position, the first outer telescoping member including a first upper telescoping portion and a first hub connecting portion with a first lower internal passage located between the first upper telescoping portion and the first hub connecting portion;

a second outer telescoping member slideably coupled to the second lower end portion of the second inner telescoping member between an extended position and a retracted position and fixedly coupled to the first outer telescoping member; and an electrical cord located in the first upper internal passage and the first lower internal passage, the electrical cord being electrically coupled to a control unit that is configured and arranged to control an operation of an electrical component, and the first outer telescoping member having a cord opening with a lower end of the electrical cord extending outwardly therefrom.

* * * * *